250-203.R 56

PHOTOSENSITIVE LIGHT BEAM LOCATION INFORMATION DEVICE

Filed June 27, 1961 6 Sheets-Sheet 1

INVENTOR.
Jack V. Franck
BY Paul S. Broadhead
Manfred M. Warren
Their Attorney

PHOTOSENSITIVE LIGHT BEAM LOCATION INFORMATION DEVICE

Filed June 27, 1961 6 Sheets-Sheet 2

INVENTOR.
Jack V. Franck
BY Paul S. Broadhead
Manfred M. Warren
Their Attorney

Dec. 7, 1965 J. V. FRANCK ETAL 3,222,526

PHOTOSENSITIVE LIGHT BEAM LOCATION INFORMATION DEVICE

Filed June 27, 1961 6 Sheets-Sheet 3

INVENTOR.
Jack V. Franck
BY Paul S. Broadhead
Manfred M. Warren
Their Attorney

PHOTOSENSITIVE LIGHT BEAM LOCATION INFORMATION DEVICE

Filed June 27, 1961 6 Sheets-Sheet 4

INVENTOR.
Jack V. Franck
BY Paul S. Broadhead
Manfred M. Warren
Their Attorney

Dec. 7, 1965 J. V. FRANCK ETAL 3,222,526

PHOTOSENSITIVE LIGHT BEAM LOCATION INFORMATION DEVICE

Filed June 27, 1961 6 Sheets-Sheet 5

INVENTOR.
Jack V. Franck
BY Paul S. Broadhead

Manfred M. Warren
Their Attorney

PHOTOSENSITIVE LIGHT BEAM LOCATION INFORMATION DEVICE

Filed June 27, 1961 6 Sheets-Sheet 6

INVENTOR.
Jack V. Franck
BY Paul S. Broadhead
Manfred M. Warren
Their Attorney

United States Patent Office 3,222,526

Patented Dec. 7, 1965

3,222,526

PHOTOSENSITIVE LIGHT BEAM LOCATION INFORMATION DEVICE

Jack V. Franck and Paul S. Broadhead, Lafayette, Calif., assignors, by mesne assignments, to the United States of America as represented by the United States Atomic Energy Commission Filed June 27, 1961, Ser. No. 119,998
6 Claims. (Cl. 250—203)

The invention relates to devices used for centering upon or measuring the relative location of a point as represented by a light source or beam and is of the general type of machine described in Patent No. 2,895,053.

The device disclosed in Patent No. 2,895,053 is designed to provide for the measurement of the coordinates of a line or curve such as the paths or tracks of ionizing radiations in a bubble chamber, cloud chamber, or the like, as recorded on photographic film, the apparatus being designed to facilitate the analysis of experimental data in the field of nuclear physics by providing means for rapidly measuring and recording photographed data on particle interactions. The present apparatus has as its principal feature and object the provision of automatic means for rapidly measuring the coordinates of, or centering upon, any one of what may be many points on film, or star images or the like, the point here being represented by either a light source or a light beam.

Another object of the present invention is to provide a light beam location information device of the character above embodying a scanning system which generates independent scanning in what may be termed X and Y coordinate directions from a single beam, thus providing a centering system with independent X and Y coordinate information without intercoupling, i.e., without one affecting the other.

A further object of the present invention is to provide an apparatus of the character above which may be manually operated to bring a point to be measured into an approximate centralized position following which the apparatus will very rapidly and automatically home onto the point for its precise measuring.

The invention possesses other objects and features of advantage, some of which of the foregoing will be set forth in the following description of the preferred form of the invention which is illustrated in the drawings accompanying and forming part of this specification. It is to be understood however, that variations in the showing made by the said drawings and description may be adopted within the scope of the invention as set forth in the claims.

Referring to said drawings (six sheets):

Figure 9:
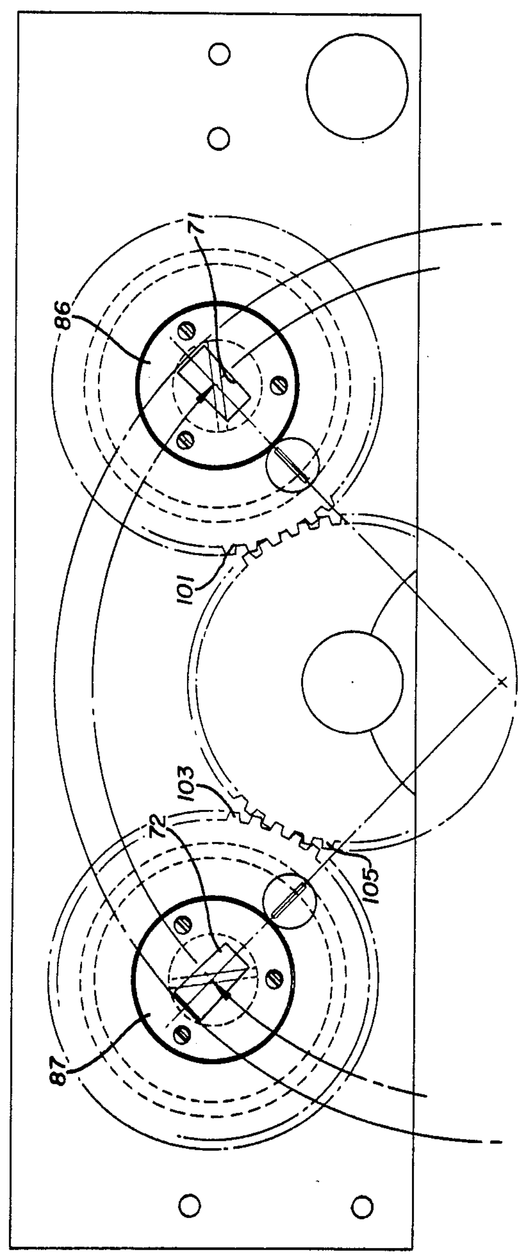
FIGURE 9 is a cross-sectional view taken substantially on the plane of line 9—9 of FIGURE 5.
Figure 10:
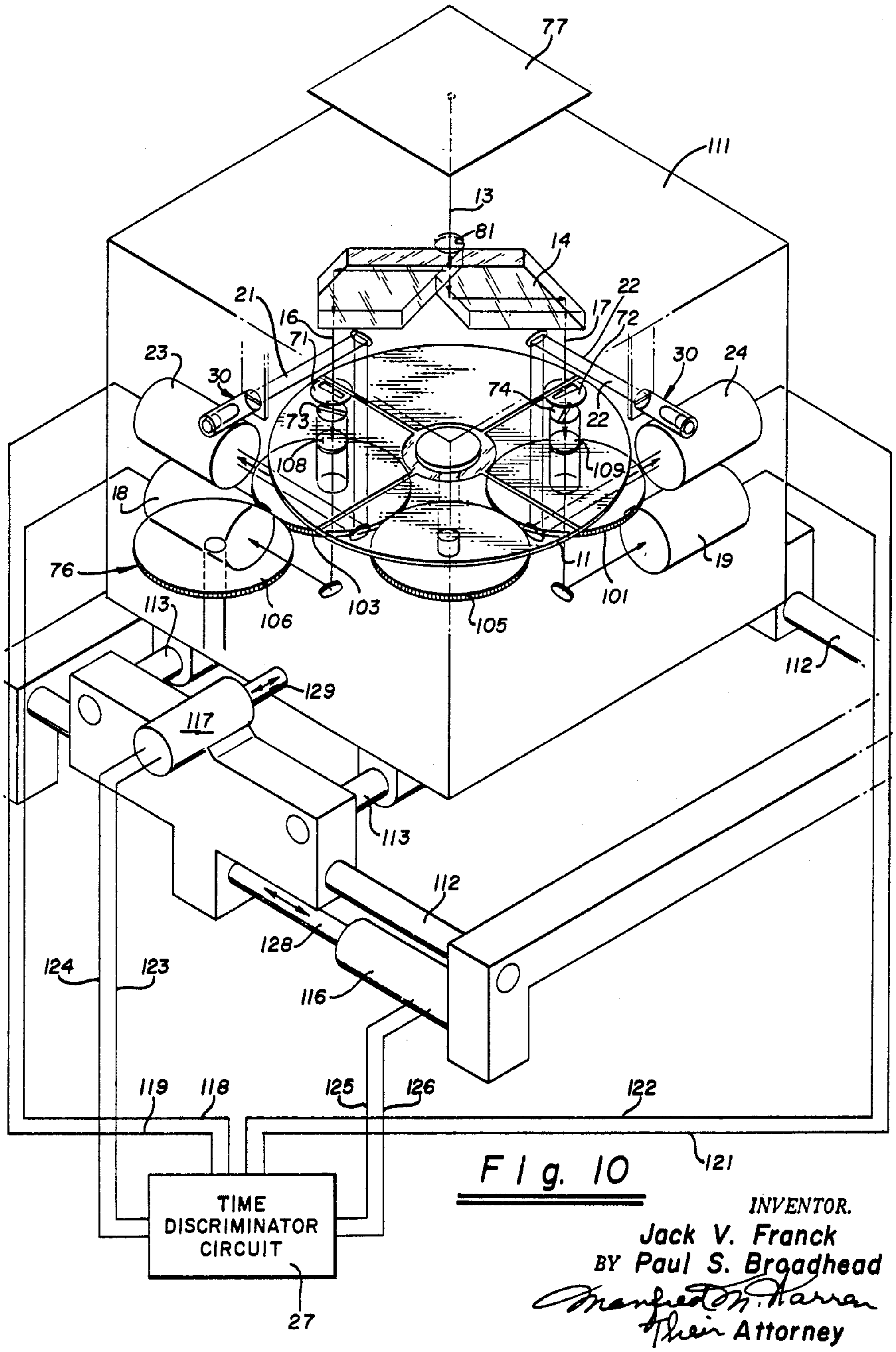
FIGURE 10 is a diagrammatical representation of the apparatus and associated structure and components.

The light beam location information device of the present invention consists briefly of a revolvably mounted scanning disk 11 and motor drive 12 therefor; optical means more fully hereinafter described mounted for receiving the reference light beam 13 and including a prism 14, see FIGURE 10, for subdividing beam 13 into X and Y beams 16 and 17 and directing the latter to the disc 11 at 90° of arc separation, see also FIGURE 9, to thereby provide independent X and Y coordinate scanning information on the relative position of beam 13. Preferably and as here shown, a photoelectric means such as photo tube 18 is mounted for receiving the projection of the X beam 16 so as to detect a change in position of the original beam along the X coordinate axis, and similarly a photoelectric means such as photo tube 19 is mounted for receiving the projection of the Y beam to detect a change in position of the original beam 13 along the Y coordinate axis.

As a further feature of the present invention a reference light beam is projected onto the scanning disc and photoelectric means is mounted for receiving the projection of this reference beam from the disc so that the relative changes in position of the X and Y coordinate beams 16 and 17 may be measured in respect to the reference light beam. Preferably a pair of such reference beams 21 and 22 are used with beam 21 directed to disc 11 for substantially simultaneous scanning with the X beam 16, and reference beam 22 being directed onto the disc for substantial simultaneous scanning with Y beam 17; and a phototube 23 is mounted for receiving the projection of reference beam 21 from the disk and phototube 24 is mounted for receiving the projection of reference beam 22 from the disc. As will be best seen from FIGURES 1, 2, 9 and 10 the scanning disc 11 is formed with a plurality of circumferentially spaced, radially extending scanning slits and the reference beams 21 and 22 are here projected onto disc 11 in substantial radial alignment with the X and Y beams 16 and 17 so that there is set up a substantial simultaneous scanning of the X and Y beams and the reference beams by each of the slits, and the electrical output from the phototubes is fed to a time discriminator circuit 27, see FIGURE 10, which measures the relative displacement of the X and Y beams and their respective reference beams.

As a further feature of the present construction optical aperture means is provided functioning to confine the reference beams 21 and 22 to sharply defined radial slits at the disc. With reference to FIGURES 1, 6, 7, 8 and 10 it will be seen that the reference beams are provided by a pair of light tubes, here given the common identifying numeral 30, of substantially identical construction so that a description of one which follows will suffice for both. These two light tube assemblies 30 are mounted in a central supporting block 30 so as to extend into intersecting relation with the radial planes of the X and Y beams. These planes are indicated by dashed lines 33 and 34 in FIGURE 1 and extend radially outwardly from the axis of rotation of disc 11 perpendicularly to the plane of rotation of the disk and at 90° of arc separation. In the present construction disc 11 is mounted on the drive shaft of electric motor 36 which is here fastened as by clamp 37 to the mounting block 31.

Figure 1:
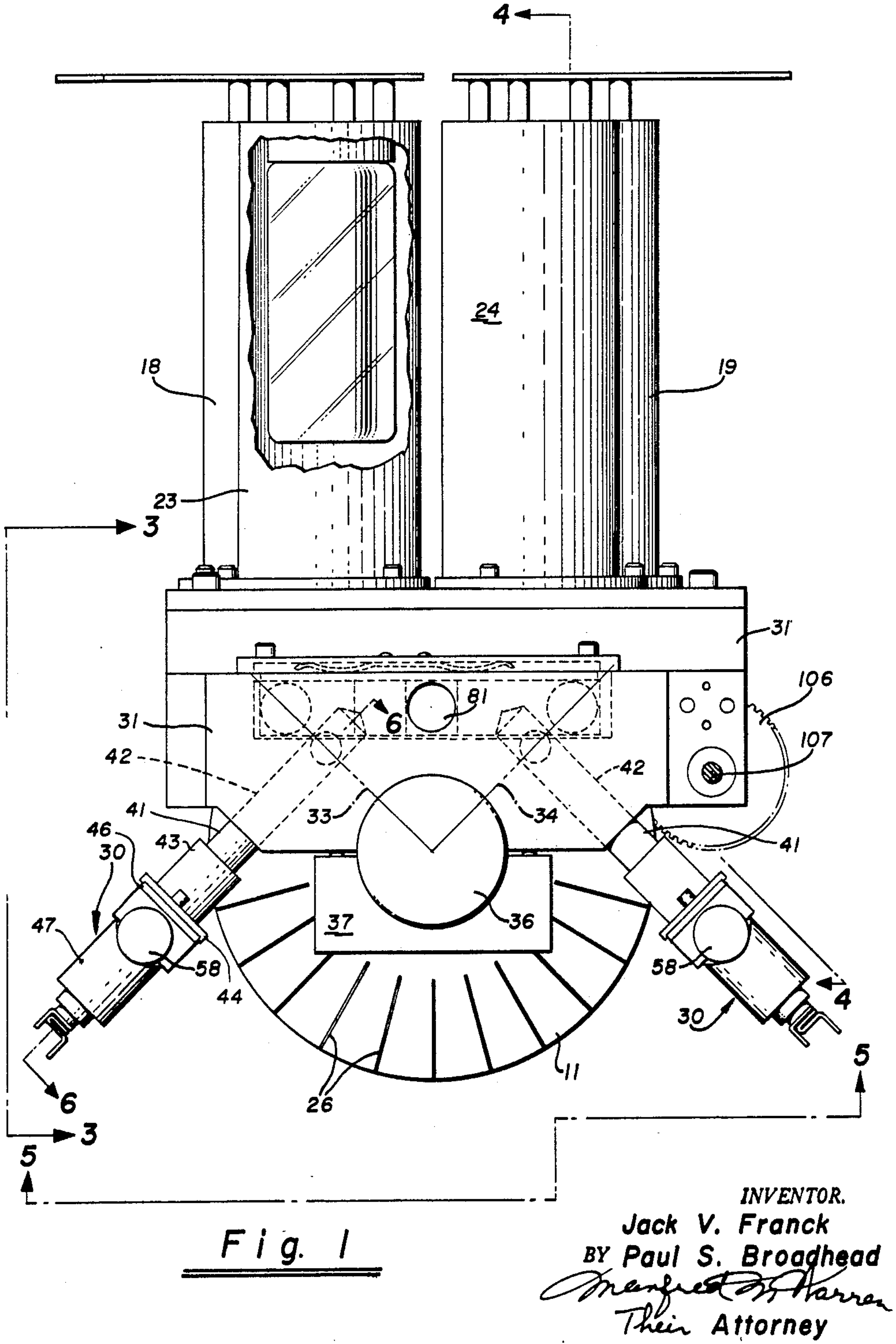
FIGURE 1 is a front elevation of a light beam location information device constructed in accordance with the present invention.
Figures 2, 3:
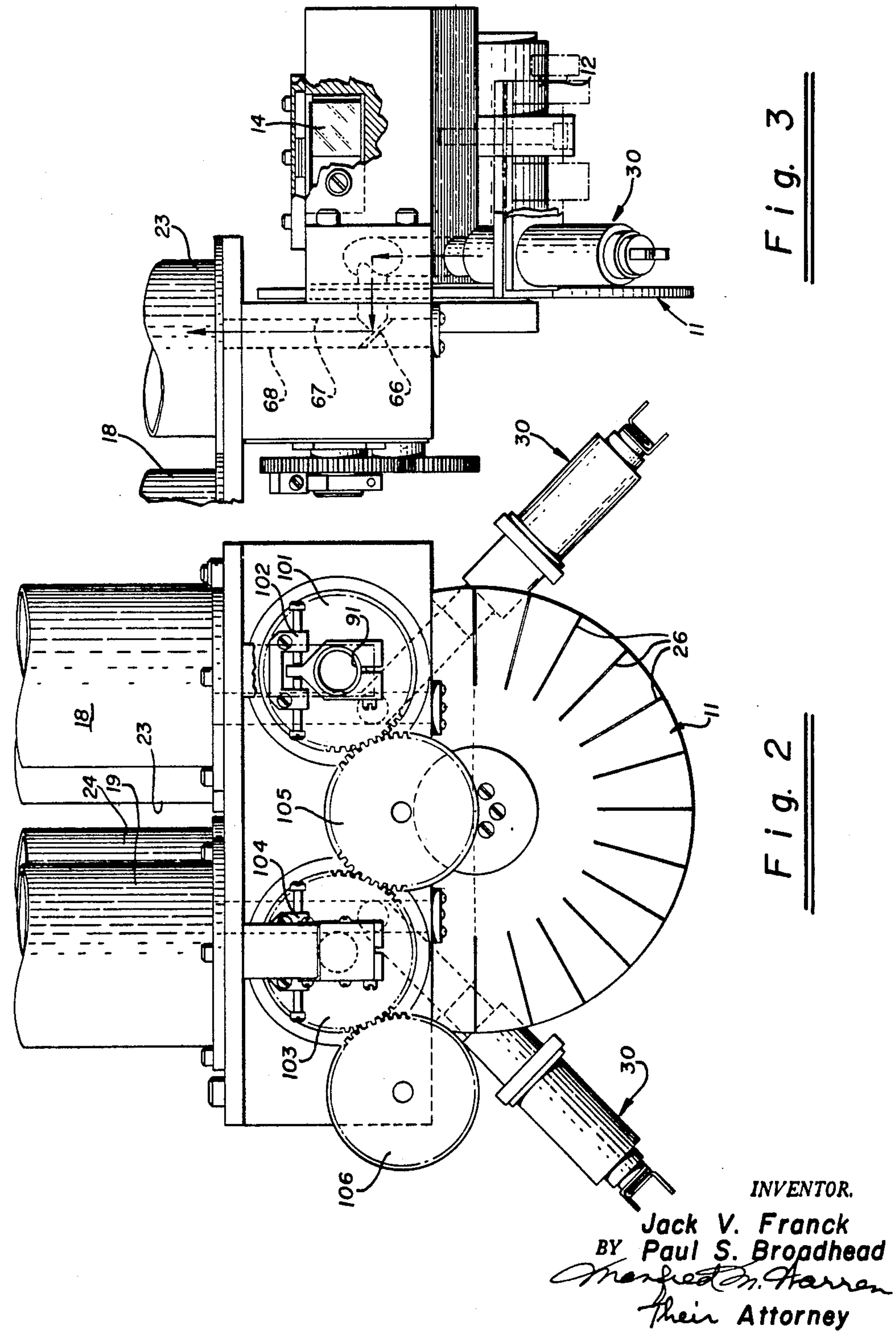
FIGURE 2 is a rear elevation of the device.
FIGURE 3 is a side elevation taken from the left side of FIGURE 1 and as suggested by the line 3—3 of FIGURE 1.
Figures 6, 7:
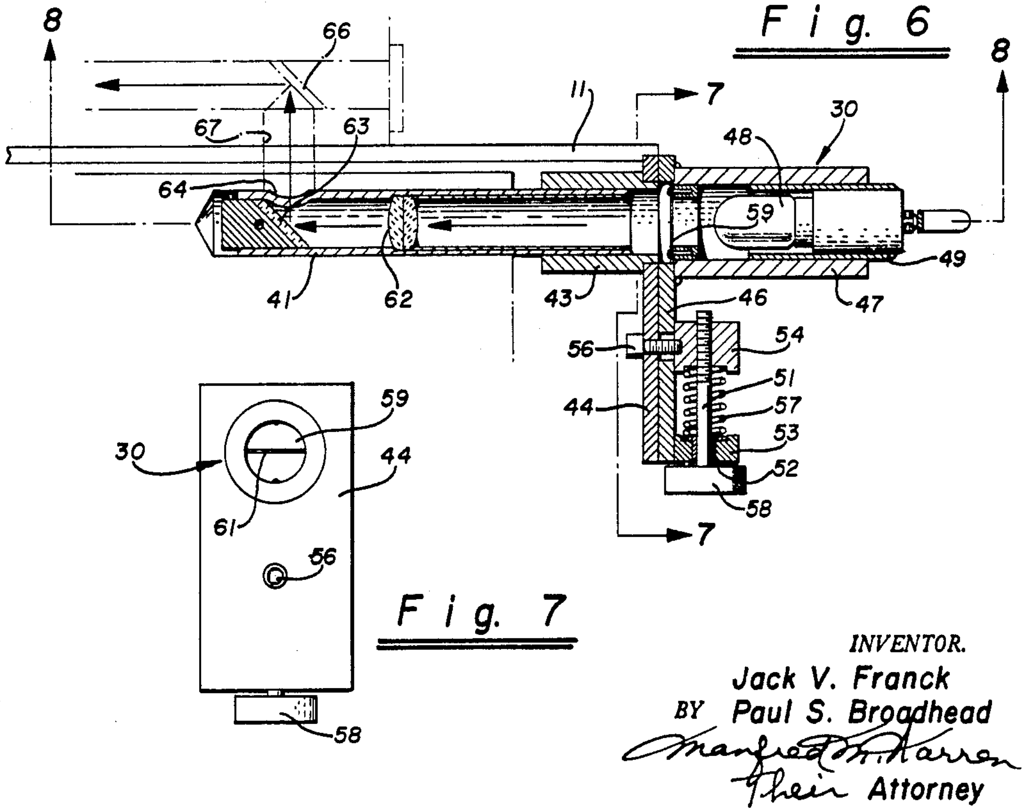
FIGURE 6 is a fragmentary cross-sectional view taken substantially on the plane of line 6—6 of FIGURE 1.
FIGURE 7 is a cross-sectional view taken substantially on the plane of line 7—7 of FIGURE 6.

With reference to FIGURES 1, 6, 7 and 8 it will be noted that each of the light tube assemblies 30 includes a tube 41 which is mounted in a bore 42 provided in the mounting block 31 and projects outwardly from the block as seen in FIGURES 1 and 6. Secured to the outer end of tube 41 is a bracket 43 having a radial bracket arm 44 extending outwardly therefrom generally perpendicular to the plane of rotation of disc 11. A slide 46 is carried by arm 44 for radial reciprocation with respect to tube 41 and perpendicular to the rotational plane of disk 11, and slide 46 here carries a light housing 47 for lamp bulb 48, the latter here being mounted in a socket 49 secured to housing 47. Movement of the lamp housing 47 relative to the fixed tube 41 is here under the manual control of a micrometer adjustment screw 51 which is here mounted for axial displacement in a bearing 52 provided in an offset portion 53 of slide 46, and is threaded at its free end into a stationary mounting block 54 secured, as by screw 56 to the bracket arm 44. A spring 57 constantly urges the slide 46 to a radial outer position against the underside of an enlarged turning knob 58 on the screw 51 whereby on rotation of knob 58 the slide 46 may be caused to move in and out on the bracket arm 44. The housing 47 is provided with an end opening in normal registration with the interior of tube 41 for the transmission of light from bulb 48 longitudinally through the tube 41, and in accordance with the present construction there is provided at the end face of housing 47 and in slide 46 a slotted disc 59 having a transverse open slit 61 therein which is generally parallel in its length with the plane of rotation of disc 11. A lens 62 is here mounted in tube 41 so as to focus the light passing through slit 61 into a sharply defined radial slit at the disc. A mirror 63 is obliquely mounted in tube 41 adjacent its inner end for reflecting the light slit from lens 62 through an opening 64 provided in the tube 41 and housing 31 onto the disc 11. Light passing through one of the radial slits 26 of disc 11 is received by a mirror 66, see FIGURES 3 and 6, mounted in a light bore 67 in the mounting block 31 and is projected from the mirror through light bore 68 to phototube 23 or 24 as the case may be. In the foregoing arrangement it will be noted that the manually engageable adjustment screw 51 provides for a minute and precise adjustment of the sharply defined radial reference beam slits into radial alignment with the X and Y beams.

If desired, the information from the four photoelectric tubes may be projected out to a cathode ray tube or tubes for viewing rather than to the time discriminator circuit 27. In such case phototubes 18 and 23 are preferably fed to one cathode ray tube for simultaneous viewing of the X beam 16 and its associated reference beam 21, and similarly, phototubes 19 and 24 are fed to a second cathode ray tube for simultaneous viewing of the images of the Y beam 17 and its associated reference beam 22. In this fashion a physical, viewable registration (or relative separation) of each of the coordinate beams 16 and 17 and their respective reference beams may be obtained. This registration is independent of the speed of the scanning disc. If the scanning disc slows down, the images will widen on the screen, but the center of the "beeps" will always remain a constant. Since the same scanning disc slit scans both the marker or reference lights and the coordinate X and Y beams, the angular distribution of the slits on the disc is not critical. The width of individual slits is also not critical. Thus, absolute radial alignment of the slits 26 is not required, but the slits should be all symmetrical to a radius.

Figure 4:
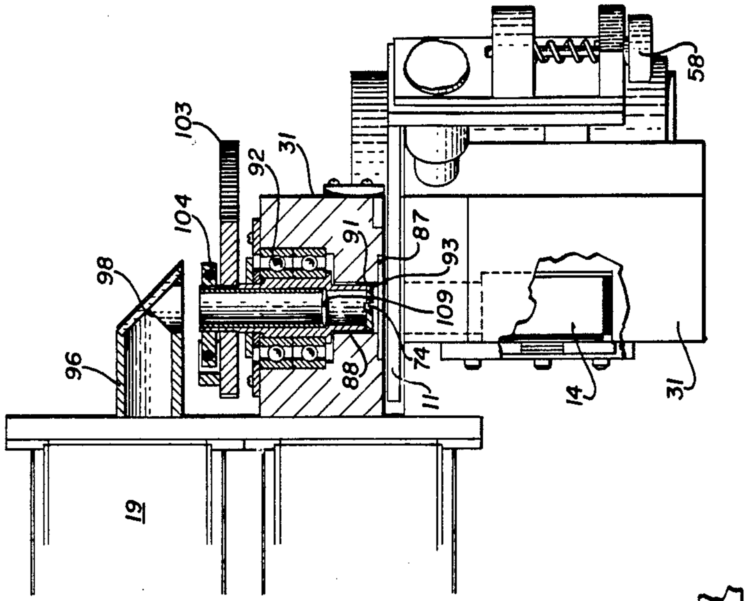
FIGURE 4 is a fragmentary cross-sectional view taken substantially on the plane of line 4—4 of FIGURE 1 and line 4—4 of FIGURE 5.
Figure 5:
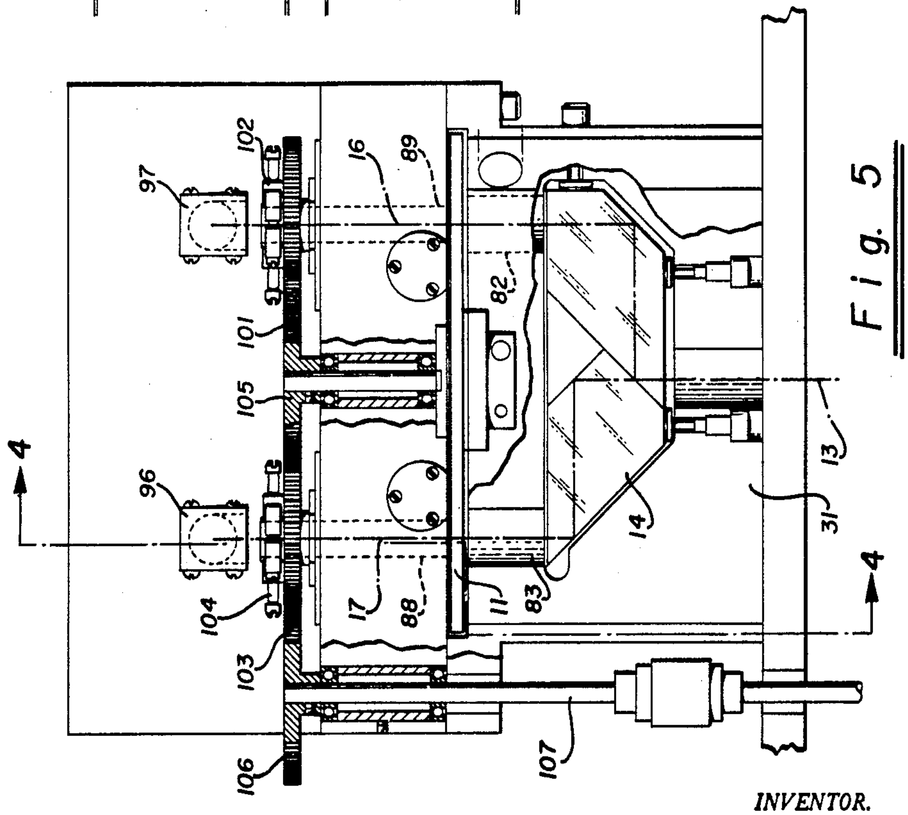
FIGURE 5 is a bottom view of the apparatus as suggested by line 5—5 in FIGURE 1 with parts deleted and others broken away for clarity of illustration.
Figure 8:
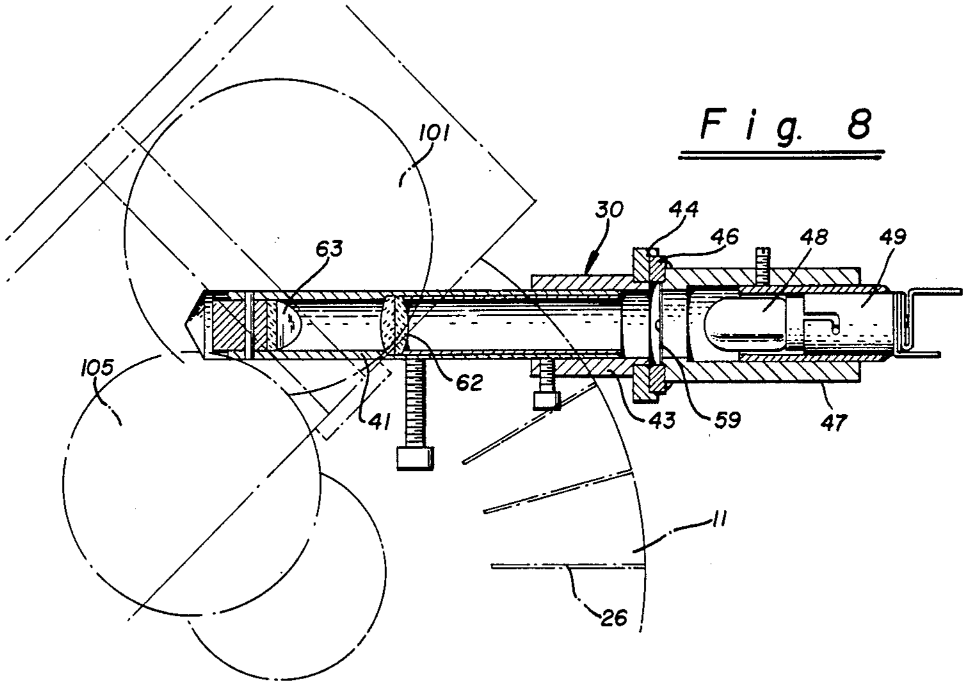
FIGURE 8 is a cross-sectional view taken substantially on the plane of line 8—8 of FIGURE 6.

The reference light beam to be centered upon, or measured is not always or even likely to be perfectly round. More commonly, the reference light beam may be elongated, oblong, oval or of other non-circular form. In accordance with the present invention, means is provided for accommodating the apparatus to such beam forms to afford an improved output signal and more particularly, an improved signal to noise ratio. To accomplish this result we use in each of the reference beam channels a combination of apertures including a fixed aperture 71 for X beam 16 and 72 for Y beam 17. These fixed apertures are elongated radially with respect to disc 11. We also use a pair of rotatable aperture means 73 and 74 in the X and Y light paths respectively and which each provide an enlogated rotatable light aperture; and manually operable means 76 for rotating the apertures 73 and 74 and thereby controlling the relative angular relation of each pair of fixed and movable apertures. Following next the travel of the main or reference light beam, the beam may be from an original source or derived from a film 77 as depicted in FIGURE 10. The apparatus is positioned to pass the reference beam 13 into an aligned light receiving opening 81 in the central supporting block 31, see FIGURES 1, 4, 5 and 10, for impinging upon the beam splitting prism 14 mounted within the block. From the prism 14 the individual X and Y beams 16 and 17 project through light bores 82 and 83 in the block to the scanning disc 11. At the opposite side of the scanning disc and aligned with bores 82 and 83 are a pair of fixed aperture discs or masks 86 and 87. These are mounted as will be best seen in FIGURES 4 and 9 in covering relation to continuation light bores 88 and 89 provided in the mounting block 31 at the under or opposite side of disc 11 and the masks 86 and 87 are formed with the aforementioned fixed apertures 71 and 72. Preferably the latter are pie-shaped and are set radially with respect to the disc as seen in FIGURE 9. Journalled for rotation in bores 88 and 89 are light tube assemblies as best illustrated in cross section in FIGURE 4. Each of these assemblies includes a light tube 91 mounted in bearings 92 for coaxial rotation within the bores 88 and 89. The interior end of tube 91 is closed by a disc 93 having a cross slot therein, providing the aforementioned rotatable apertures 73 for the X-beam 16 and 74 for the Y-beam 17. Rotation of tube 91 thereby enables a rotation of the elongated light apertures 73–74 into relative angular positions with respect to the pie-shaped apertures 71–72 in the fixed masks 86–87. From light tubes 91 the X and Y beams pass into the open ends of light tubes 96 and 97 where they are reflected by internally positioned mirrors 98 to their respective phototube 18 or 19 as the case may be.

As a further feature of the present apparatus, a common drive is provided for the rotatable apertures 73–74 for simultaneously controlling and maintaining similar relative angular settings of the two pairs of apertures used for the two X and Y beams 16 and 17. As here best shown in FIGURES 2, 4, 5 and 10 this common drive includes a gear 101 secured as by adjustable mounting clamp 102 to the rotating light tube 91 mounted in light bore 89; a similar gear 103 being similarly secured by adjustable mounting clamp 104 to the rotating light tube 91 mounted in light bore 88; an idler gear 105 constantly enmeshed with gears 101 and 103 to maintain a synchronous drive; and a driving gear 106 here enmeshed with gear 103 and having a manually engageable drive shaft 107 extending therefrom. The adjustable mounting clamps 102 and 104 make possible the setting of the rotating apertures 73–74 in a precise 90° phase relationship, and the intercoupled gears insure a retention of this relationship during rotation of the apertures by the manual adjustment shaft 107. In this manner, shaft 107 may be rotated to set the elongation of the rotating apertures 73–74 coincident with any elongation occurring in the reference beams thereby passing a maximum light quantity through each pair of fixed and rotating apertures and restricting the aligned area as much as feasible to the shape of the reference beams, thus affording an improved signal to noise ratio.

As another feature of the present construction we provide in each of the X and Y beam paths, a lens 108 in the X beam 16 and 109 in the Y beam 17, which is constructed for imaging the original source on the phototube thereby fixing the excitation position thereon. In the present construction lenses 108 and 109 are carried in the rotating light tubes 91 at the underside of the scanning disc and these lenses "look" directly through the scanning disc to the original source of light and as above noted image that source on the associated photocathode. If the original source is stationary, the image on the photocathode will be stationary, not withstanding the movement of the slit of the scanning disc across the aperture. This arrangement enables the use of a particular spot on the photocathode, the sensitivity of which relative to other spots on the face of the photocathode is constant. If the light spot on the photocathode were to move around, the gain or output of the phototube would be different by reason of the non-uniformity of sensitivity of the photocathode over its surface.

As hereinabove noted, one of the important uses of the present apparatus is its ability to automatically home on a light beam representing the point to be located and/or recorded. The machine may be manually set to roughly center upon a light image and then by referring the centering action to electronic controls operating from the several phototubes herein described, the machine will very rapidly and very accurately center upon the light image, and if desired, to record the coordinates of that image. This electronic operation is very much faster and more accurate than can be obtained manually. The whole automatic apparatus is diagrammatically depicted in FIGURE 10 and includes a carriage 111 mounted for movement on ways 112 and 113 corresponding with X and Y coordinate axes; electric motors 116 and 117 for so moving the carriage; the optical beam splitting and scanning apparatus as above described being carried by the carriage; and a time discriminator circuit 27 which is connected to the several phototubes and which produces an output voltage as a function of the time interval occurring in the scanning of the X and Y and reference beams, the output of the discriminator circuit being applied to motors 116 and 117. The purpose of the time discriminator circuit is to compare the two signals from each of the coordinate and reference phototubes and applying an appropriate correction voltage to the servomotors 116 and 117. As will be noted the time discriminator circuit has one input connected by leads 118 and 119 to phototubes 18 and 23 and a second input connected by leads 121 and 122 to phototubes 19 and 24. The discriminator circuit may be of conventional design and is of the class producing a D.C. output voltage proportional to the time interval elapsing between the two input signals, the polarity of the output indicating whether the track pulse precedes or follows the reference pulse. The output of the time discriminator corresponding to one input is applied by leads 123 and 124 to servo-motor 117 and the other output of the time discriminator circuit is applied by leads 125 and 126 to servo-motor 116. As will be observed from FIGURE 10 servo-motor 116 has a connection 128 to the chassis for moving it along ways 112 and servo-motor 117 has a connection 129 for moving the carriage along ways 113. A conventional time discriminator circuit is referred to in Patent 2,895,053 above referred to.

The lead screws or drive connections 128 and 129 may be connected to a suitable encoder for recording the location of the point source 13. Thus, after the machine has been roughly centered on the source image, the operator needs only to press a button for putting in operation the automatic controls for substantially instantaneously homing and locking upon the reference point and if desired, recording its position in terms of rectangular X and Y coordinates.

We claim:

1. A light beam location information device comprising, a revolvably mounted scanning disc and motor drive therefor, optical means mounted for receiving said light beam and being formed for subdividing said beam into X and Y beams and directing said X and Y beams perpendicularly to the plane of said disc at 90° of arc separation, a reference light beam projected to said scanning disc, and photoelectric means mounted for receiving the projections of said X and Y and reference beams from said disc and detecting relative movement between said X and Y beams and said reference beam.

2. A light beam location information device comprising, a revolvably mounted scanning disc having light transmitting scanning slits and a motor drive for said disc, optical means mounted for receiving said light beam and being formed for subdividing said beam into X and Y beams and directing said X and Y beams to said disc at 90° of arc separation, a reference beam directed to said disc for substantially simultaneous scanning with said X beam by each of said slits, a second reference beam directed to said disc for substantial simultaneous scanning with said Y beam by each of said slits, and photoelectric means mounted for receiving the projections of said X and Y and reference beams from said disc and detecting relative movement between said X and Y beams and their respective reference beams.

3. A light beam location information device as characterized in claim 2 and including aperture means confining said reference beams to sharply defined radial slits at said disc, and means for adjustably displacing said aperture means to effect radial alignment of said X and Y beams with their respective reference beams.

4. A light beam location information device comprising, a revolvably mounted scanning disc having radial scanning slits and a motor drive for said disc, a plurality of photoelectric devices, optical means mounted for receiving said light beam and being formed for subdividing said beam into X and Y beams and providing light paths therefor to said disc at 90° of arc separation and through said disc to said photoelectric devices, a first aperture means in each of said light paths providing a relatively fixed aperture elongated radially with respect to said disc, a rotatable aperture means in each of said light paths and providing an elongated rotatable light aperture, and manually operable means for rotating said second aperture means for controlling the relative angular relation of each pair of fixed and movable apertures.

5. A light beam location information device as characterized in claim 4, and including a common drive for said rotatable aperture means for simultaneously controlling and maintaining similar relative angular settings of said pairs of apertures.

6. A point centering device adapted for homing on a light beam representing said point and comprising, a carriage mounted for movement on X and Y coordinate axes, motors for so moving said carriage, a revolvably mounted scanning disc and motor drive therefor carried by said carriage, optical means mounted on said carriage for receiving said light beam and being formed for subdividing said beam into X and Y beams and directing said X and Y beams to said disc at 90° of arc separation, a reference light beam projected to said scanning disc, photoelectric means mounted for receiving the projections of said X and Y and reference beams from said disc, and a time discriminator circuit connected to said photoelectric means and producing an output voltage as a function of the time interval occurring in the scanning of said beams, the output of said discriminator circuit being applied to said motors.

References Cited by the Examiner

UNITED STATES PATENTS

| | | | |
|---|---|---|---|
| 2,503,165 | 4/1950 | Meyer | 88—14 |
| 2,895,053 | 7/1959 | Franck et al. | 250—202 |
| 3,014,131 | 12/1961 | Hutchens et al. | 250—233 X |

RALPH G. NILSON, *Primary Examiner.*

WALTER STOLWEIN, *Examiner.*